United States Patent
Ohira et al.

(10) Patent No.: US 10,235,607 B2
(45) Date of Patent: Mar. 19, 2019

(54) CONTROL DEVICE, CONTROL METHOD, AND COMPUTER PROGRAM PRODUCT

(71) Applicant: Kabushiki Kaisha Toshiba, Minato-ku (JP)

(72) Inventors: Hidetaka Ohira, Kawasaki (JP); Yuto Yamaji, Kawasaki (JP); Tomoyuki Shibata, Kawasaki (JP); Osamu Yamaguchi, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 24 days.

(21) Appl. No.: 15/440,520

(22) Filed: Feb. 23, 2017

(65) Prior Publication Data

US 2017/0344858 A1 Nov. 30, 2017

(30) Foreign Application Priority Data

May 30, 2016 (JP) .................................. 2016-107454

(51) Int. Cl.
- *G06K 9/00* (2006.01)
- *G06K 9/62* (2006.01)
- *G06T 7/20* (2017.01)
- *H04N 7/18* (2006.01)

(52) U.S. Cl.
CPC ....... *G06K 9/6277* (2013.01); *G06K 9/00221* (2013.01); *G06K 9/00771* (2013.01); *G06T 7/20* (2013.01); *H04N 7/183* (2013.01)

(58) Field of Classification Search
CPC .... G06K 9/6277; G06K 9/00771; G06T 7/20; H04N 7/183

USPC .......................................................... 382/103
See application file for complete search history.

(56) References Cited

U.S. PATENT DOCUMENTS

| | | | |
|---|---|---|---|
| 7,064,769 B2 | 6/2006 | Speigle et al. | |
| 8,797,416 B2 | 8/2014 | Hirata | |
| 8,938,092 B2 | 1/2015 | Adachi | |
| 2008/0175509 A1* | 7/2008 | Wheeler | G06K 9/00281 382/260 |
| 2008/0267458 A1* | 10/2008 | Laganiere | G06K 9/00221 382/118 |
| 2012/0063674 A1* | 3/2012 | Yano | G06K 9/00221 382/159 |
| 2013/0243274 A1* | 9/2013 | Sukegawa | G06K 9/00221 382/118 |
| 2013/0329948 A1* | 12/2013 | Minagawa | G06T 7/004 382/103 |

FOREIGN PATENT DOCUMENTS

| | | |
|---|---|---|
| JP | 7-73298 | 3/1995 |
| JP | 3461190 | 10/2003 |
| JP | 3726972 | 12/2005 |
| JP | 2008-85995 | 4/2008 |
| JP | 2010-86429 | 4/2010 |

(Continued)

*Primary Examiner* — Ping Y Hsieh
(74) *Attorney, Agent, or Firm* — Oblon, McClelland, Maier & Neustadt, L.L.P.

(57) ABSTRACT

A control device includes one or more processors. The processors detect a target captured in an image, and calculate likelihood indicating whether the target is concealed. The processors decide on an output method for outputting the target according to the likelihood. The processors generate a display image based on the image and the decided output method.

10 Claims, 9 Drawing Sheets

(56) References Cited

FOREIGN PATENT DOCUMENTS

| | | |
|---|---|---|
| JP | 2012-103865 | 5/2012 |
| JP | 5752976 | 7/2015 |
| JP | 5851108 | 2/2016 |

* cited by examiner

CONTROL DEVICE, CONTROL METHOD, AND COMPUTER PROGRAM PRODUCT

CROSS-REFERENCE TO RELATED APPLICATIONS

This application is based upon and claims the benefit of priority from Japanese Patent Application No. 2016-107454, filed on May 30, 2016; the entire contents of which are incorporated herein by reference.

FIELD

Embodiments described herein relate generally to a control device, a control method, and a computer program product.

BACKGROUND

A technology has been proposed in which mobile objects that are occasionally concealed are detected from images and the detection result is displayed. In this technology, for example, regarding a person who is captured to be freely walking in surveillance camera images, the positions of the face of that person are estimated from the part of movement within the screen. However, if the face is not detected at the estimated positions, then it is determined that the person is concealing his or her face; and display control is performed in the form of zooming in the face part.

However, in the conventional technology, there are times when it is not possible to confirm a concealed target. For example, in a face detector, an upper-body detector, or a human detector; the supposed position of a face is sometimes erroneously determined regardless of the fact that no face is present, or a face is erroneously determined to have been concealed regardless of the fact that the face is not concealed. Hence, such erroneous determination sometimes makes it difficult to confirm the persons who are concealing their faces.

DETAILED DESCRIPTION

According to one embodiment, a control device includes one or more processors. The processors detect a target captured in an image, and calculate likelihood indicating whether the target is concealed. The processors decide on an output method for outputting the target according to the likelihood. The processors generate a display image based on the image and the decided output method.

Exemplary embodiments of a control device according to the embodiment are described below in detail with reference to the accompanying drawings.

First Embodiment

A control device according to a first embodiment detects a target object for detection (such as a person or a vehicle) from an image, and calculates the likelihood indicating whether the target is concealed. Then, according to the likelihood, the control device decides on the output method for outputting the target; generates a display image based on the decided output method; and outputs the display image. As a result, it becomes possible to confirm the concealed target with more ease.

Figure 1:
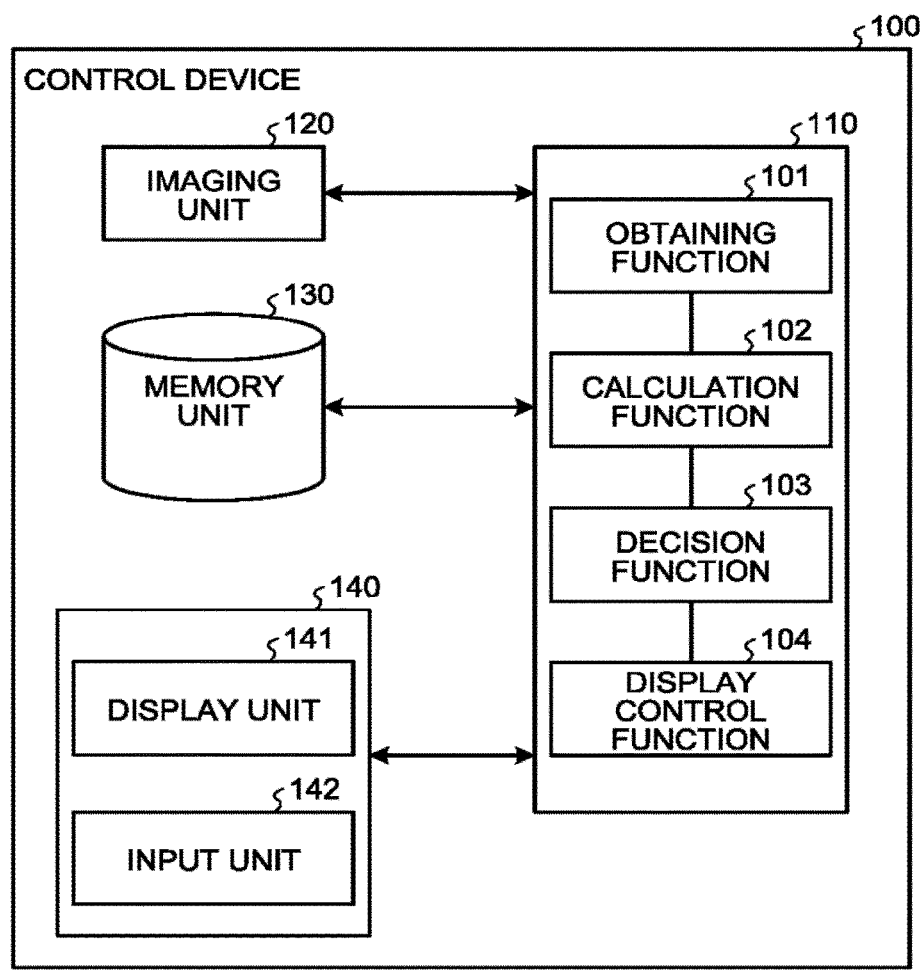
FIG. 1 is a block diagram of a control device according to a first embodiment.

FIG. 1 is a block diagram illustrating an exemplary configuration of a control device 100 according to the first embodiment. As illustrated in FIG. 1, the control device 100 includes a processor circuit 110, an imaging unit 120, a memory unit 130, and a user interface (UI) unit 140. The memory unit 130, the UI unit 140, and the imaging unit 120 are electrically connected to the processor circuit 110.

The UI unit 140 has a display function for displaying various images and has an input function for receiving various operation instructions from the user. In the first embodiment, the UI unit 140 includes a display unit 141 and an input unit 142. The display unit 141 displays various images. Examples of the display unit 141 include a cathode ray tube (CRT) display, a liquid crystal display, an organic electroluminescence (EL) display, and a plasma display. The input unit 142 receives input of various instructions and information from the user. Examples of the input unit 142 include a keyboard, a mouse, a switch, and a microphone.

Meanwhile, the UI unit 140 can alternatively be configured as a touch-sensitive panel in which the display unit 141 and the input unit 142 are integrated. The UI unit 140 is connected to the processor circuit 110 in a wired manner or a wireless manner. Alternatively, the UI unit 140 can be connected to the processor circuit 110 via a network.

The imaging unit 120 takes photographs and obtains images. For example, the imaging unit 120 is a digital camera. Herein, the imaging unit 120 can be installed at a distant position from the processor circuit 110. For example, the imaging unit 120 can be a surveillance camera installed on a road, or at a public space, or inside a building. Alternatively, the imaging unit 120 can be a vehicle-mounted camera installed in a mobile object such as a vehicle, or can be a camera installed in a handheld terminal. Still alternatively, the imaging unit 120 can be a wearable camera. Herein, the configuration can be such that the imaging unit 120 is installed on the outside of the control device 100, and the images taken by the imaging unit 120 are obtained by the control device 100 via a network.

Meanwhile, the imaging unit 120 is not limited to be a visible-light camera that captures the reflected light attributed to visible light; but can alternatively be an infrared camera, a camera capable of obtaining a depth map, or a camera that takes images using a distance sensor or an ultrasonic sensor. That is, the images used in the first embodiment can be images capturing the reflected light attributed to visible light, or infrared images, or depth maps, or images capturing ultrasonic waves; and are not limited to a particular type of images.

The memory unit 130 is used to store a variety of data. For example, the memory unit 130 is used to store the images taken by the imaging unit 120. For example, the memory unit 130 can be implemented using a memory medium such as a hard disk drive (HDD), a solid state drive (SSD), a read only memory (ROM), or a memory card in which the information can be stored at least in a magnetic manner, or in an optical manner, or in an electrical manner. Moreover, there is no limitation to have only a single memory medium constituting the memory unit 130. Alternatively, the memory unit 130 can be configured using a plurality of memory media. Furthermore, the memory unit 130 can be substituted with an external memory device installed on the outside of the control device 100.

The processor circuit 110 has an obtaining function 101, a calculation function 102, a decision function 103, and a display control function 104. Herein, the obtaining function 101, the calculation function 102, the decision function 103, and the display control function 104 are examples of an obtaining unit, a calculating unit, a deciding unit, and a display control unit, respectively. Regarding these processing functions, the explanation is given later.

The processing functions implemented in the control device 100 are, for example, stored in the form of computer programs in the memory unit 130. The processor circuit 110 represents a processor that reads a computer program from the memory unit 130 and executes the computer program so that the corresponding function is implemented. Thus, when the processor circuit 110 has read all computer programs, the functions illustrated in the processor circuit 110 in FIG. 1 are implementable.

Meanwhile, in FIG. 1, although only a single processor circuit 110 is illustrated, it is alternatively possible to configure the processor circuit 110 by combining a plurality of independent processors. Moreover, either each processing function can be configured as a computer program that the processor circuit 110 executes, or some or all of the processing functions can be installed in dedicated and independent execution circuits. That is, the processing functions can be implemented using software, or can be implemented using hardware, or can be implemented using a combination of software and hardware.

Meanwhile, the term "processor" in the explanation given above implies, for example, any of the following circuits: a central processing unit (CPU), a graphical processing unit (GPU), an application specific integrated circuit (ASIC), a programmable logic device (such as a simple programmable logic device (SPLD) or a complex programmable logic device (CPLD)), and a field programmable gate array (FPGA).

The processor reads the computer programs stored in the memory unit 130 and implements the functions. Herein, instead of storing the computer programs in the memory unit 130, it is alternatively possible to directly embed the computer programs in the processor circuitry. In that case, the processor reads the computer programs embedded in the circuitry and implements the functions.

The obtaining function 101 obtains the target image for processing. For example, the obtaining function 101 obtains an image from the imaging unit 120 (a vehicle-mounted camera, a video camera, or a network camera). The obtaining function 101 either can obtain images online and in real time, or can obtain images offline from the memory medium such as the memory unit 130 in which the images are stored.

The calculation function 102 detects the target captured in an image, and calculates the likelihood indicating whether the detected target is concealed. Examples of the target for detection include a person, some part (such as the face) of a person, a vehicle, and some part (such as the license plate of a vehicle). However, those are not the only possible examples. Moreover, for example, when the target is a person (face); examples of an object for concealment that is used in concealing the target include a mask, sunglasses, a face mask, and a hand. A person who does not wish to be identified may conceal his or her face using such an object for concealment, so as to ensure that the face is not captured in the image. When the target is a vehicle (license plate), examples of the object for concealment includes a board. A person who does not wish to be identified may conceal the number plate using such an object for concealment, so as to make the vehicle unidentifiable.

As far as the method for detecting the target from an image and calculating the likelihood is concerned, it is possible to implement any conventional method such as the method in which collation is done with a pre-registered pattern (of colors, luminance values, luminance gradients, or the like) representing the target.

For example, the calculation function 102 calculates the likelihood indicating the probability of being the target. For example, when the degree of coincidence with the registered feature quantity of the target is high, the calculation function 102 calculates the likelihood to be high.

In the case of using colors to detect a person and calculate the likelihood, the calculation function 102 calculates the likelihood in such a way that, when the color extracted from the image indicates the skin tone of a person, the likelihood becomes high and, when the color extracted from the image does not indicate the skin tone of a person, the likelihood becomes low. In the case of using luminance values or luminance gradients to detect a mobile object and calculate the likelihood, the calculation function 102 calculates the difference between the luminance value or the luminance gradient extracted from the image and the pre-registered luminance value or the pre-registered luminance gradient of the mobile object; and calculates the likelihood in such a way that, when the difference is small, the likelihood becomes high and, when the difference is large, the likelihood becomes low.

The likelihood calculated in this manner can be used as the information indicating that the target is being concealed. For example, at a position in an image at which the likelihood is higher than a certain threshold value, it is highly likely that the target is present. Moreover, when the target is not concealed, the likelihood increases. However, when the target is concealed, the likelihood decreases. For example, regarding a person who is concealing the face using a mask or sunglasses, since the color around the face does not indicate the skin tone, there is a decrease in the likelihood calculated based on colors. Also regarding the likelihood calculated based on luminance values or luminance gradients, since the texture or the shape changes according to the object for concealment, there occurs an increase in the difference with the preregistered luminance value or the preregistered luminance gradient of the target, and the likelihood decreases.

In that regard, in the first embodiment, the target is determined to be more concealed if the likelihood is higher than a threshold value and the likelihood is smaller.

The decision function 103 decides the output method for outputting the target according to the likelihood. For example, if the likelihood is higher than a threshold value (a first threshold value) and the likelihood is smaller, the decision function 103 determines that the target is being more concealed and decides on the output method in which the target is displayed in a highlighted manner. As a result, it becomes possible to easily confirm the target having an object for concealment. Moreover, the decision function 103 can decide on the output method in which, from among the concealed targets, the target having the smaller likelihood is displayed in the more highlighted manner. Regarding the target having the likelihood equal to or higher than a second threshold value (a threshold value greater than the first threshold value), the decision function 103 can determine that no object for concealment is present and decide on the output method in which nothing is highlighted.

The method of highlighted display can be any arbitrary method. For example, it is possible to implement the method of changing the display format of the image in which the target is identified, or it is possible to implement the method in which the target is displayed in an enlarged manner. Examples of an image in which the target is identified include a frame of a predetermined shape (such as rectangular, circular, or elliptical). Examples of the display format include the line width, the line color, and the line transparency. For example, the decision function 103 decides on the output method in which, higher the necessity to display a target in a highlighted manner, the greater is the line width, or the darker is the line color, or the lower is the line transparency.

The display control function 104 controls the display operation of displaying information on the display unit 141. For example, based on the obtained image and the decided output method, the display control function 104 generates a display image to be displayed on the display unit 141, and displays the display image on the display unit 141. For example, the display control function 104 generates a display image in which the target that is determined to have been concealed is highlighted. Meanwhile, the details regarding a display image are given later.

Figure 2:
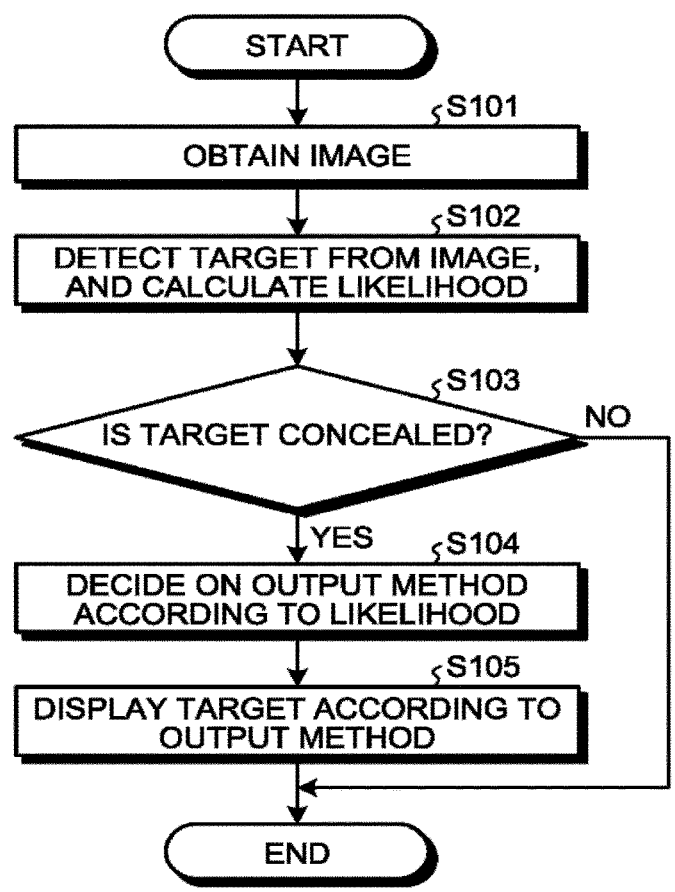
FIG. 2 is a flowchart for explaining an example of a display control operation according to the first embodiment.

Explained below with reference to FIG. 2 is a display control operation performed in the control device 100 that is configured in the abovementioned manner according to the first embodiment. FIG. 2 is a flowchart for explaining an example of the display control operation according to the first embodiment.

The obtaining function 101 obtains the target image for processing (Step S101). The calculation function 102 detects a target from the obtained image and calculates the likelihood indicating the probability of being the target (Step S102). The decision function 103 determines whether or not the detected target is concealed (Step S103). For example, if the calculated likelihood is higher than the first threshold value but is lower than the second threshold value, then the decision function 103 determines that the target is concealed.

If the target is not concealed (No at Step S103), the operations are ended without displaying the target in a highlighted manner. However, if the target is concealed (Yes at Step S103), then the decision function 103 decides on the output method according to the likelihood (Step S104). For example, the decision function 103 decides on the output method in which, lower the likelihood, the more highlighted is the display of the target. Meanwhile, instead of determining at Step S103 about whether the target is concealed, the decision function 103 can decide on the output method directly from the likelihood.

The display control function 104 displays the target according to the decided output method (Step S105). For example, regarding the target determined to have been concealed, the display control function 104 generates a display image in which, lower the likelihood, the more highlighted is the display of the target; and then displays the display image on the display unit 141.

Figure 3:
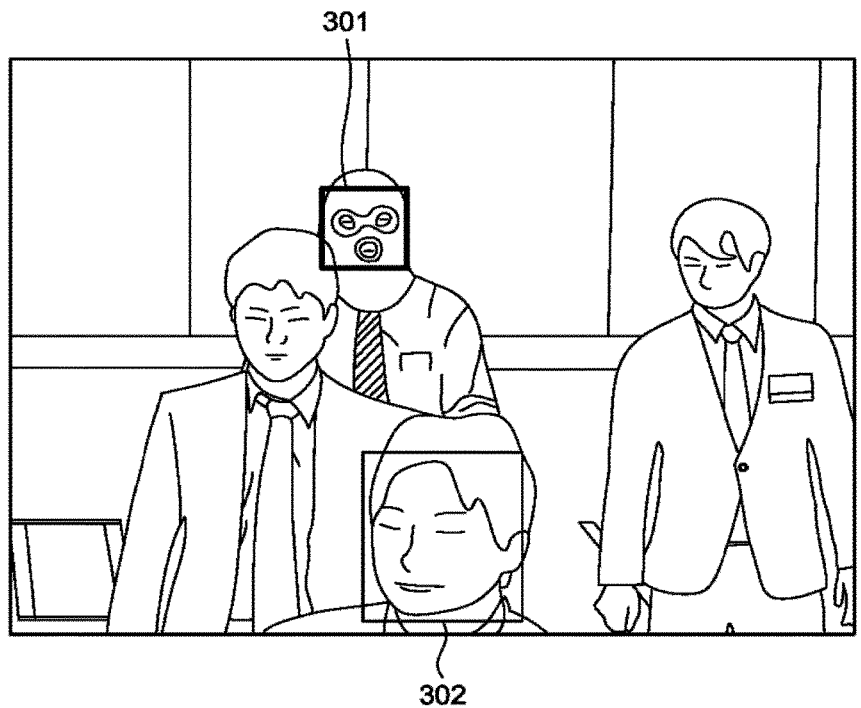
FIG. 3 is a diagram illustrating examples of a display screen according to the first embodiment.
Figure 4:
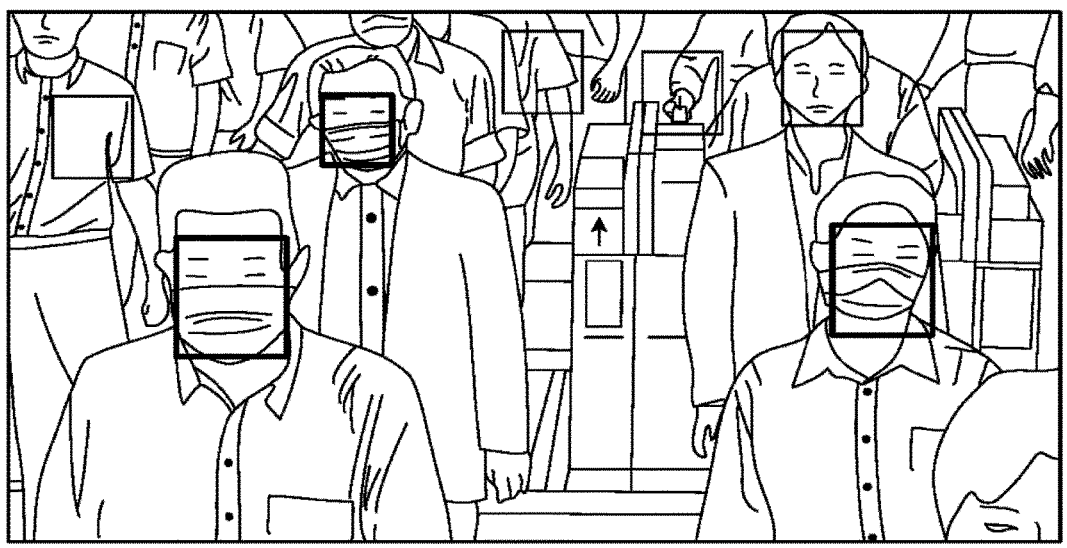
FIG. 4 is a diagram illustrating examples of a display screen according to the first embodiment.
Figure 5:
FIG. 5 is a diagram illustrating examples of a display screen according to the first embodiment.

Given below is the explanation of examples of the display screen. FIGS. 3 to 5 are diagrams illustrating examples of the display screen according to the first embodiment. In FIGS. 3 to 5 are illustrated examples in which the faces represent the target for detection and the faces concealed using masks are displayed in a highlighted manner.

In FIG. 3 is illustrated an example in which, from among four faces, the face in the upper part and the face in the lower part are displayed in a highlighted manner. A rectangle 301 is displayed using thick lines because, although the rectangle 301 is detected as a face, the likelihood of that face is low. A rectangle 302 is displayed using thin lines as compared to the rectangle 301 because the likelihood of the corresponding face is higher than the likelihood of the face corresponding to the rectangle 301. The other faces are not displayed in a highlighted manner because their likelihoods are high (equal to or higher than the second threshold value).

In FIG. 4 is illustrated an example in which areas that do not actually represent faces are also detected as faces. Even for such areas, sometimes the likelihood is calculated to be higher than the areas in which faces are concealed using objects for concealment (masks). According to the first embodiment, in such a case, the faces concealed using objects for concealment are displayed in a more highlighted manner.

In FIG. 5 is illustrated an example in which the colors of the lines are varied. A rectangle 501 is displayed using the lines of an easily-recognizable color because, although the rectangle 501 is detected as a face, the likelihood of that face is low. A rectangle 502 is displayed using faint lines as compared to the rectangle 501 because the likelihood of the corresponding face is higher than the likelihood of the face corresponding to the rectangle 501.

First Modification Example

Regarding the calculation of the likelihood indicating whether the detected target is concealed, the method is not limited to the method described above. For example, the calculation function 102 can detect, from an image, a concealed target captured in the image and calculate the likelihood indicating the probability of concealment of the target. For example, the calculation function 102 can register in advance the luminance value or the luminance gradient of a face having an object for concealment such as a mask or sunglasses; perform collation with the registered information; and calculate the likelihood of the face having the mask or the sunglasses. In that case, the calculation function 102 calculates the likelihood in such a way that, for example, higher the degree of coincidence with the registered information, the higher is the likelihood.

In the first modification example, the decision function 103 decides on the output method in which, higher the likelihood of the target (face), the more highlighted is the display thereof.

Second Modification Example

For example, in the days having a lot of pollen dust or in the days having a fair amount of sunshine, when it becomes a common practice for people to wear a mask or sunglasses, control can be performed to not display such people in a highlighted manner. In that case, the persons concealing themselves by objects other than the registered objects for concealment, such as a mask and sunglasses, can be displayed in a highlighted manner. For example, from among the targets that are determined to have been concealed (Yes at Step S103) according to the method explained in the first embodiment, the targets concealed using the registered objects for concealment can be excluded from the highlighted display. Whether or not a target is concealed using a registered object for concealment can be detected according to the method explained in the first modification example.

In this way, in the control device according to the first embodiment, the output method is decided according to the likelihood indicating whether a target is concealed; and a display image is generated and output based on the decided output method. As a result, for example, the targets with an object for concealment can be displayed in a highlighted manner. That is, the concealed targets can be confirmed with more ease.

Second Embodiment

In a control device according to a second embodiment, firstly, a first target (such as the entire body or the upper body of a person) captured in an image is detected. That is followed by detecting a second target representing some part (such as the face) of the first target. Then, the likelihood indicating whether the second target is concealed is calculated.

Figure 6:
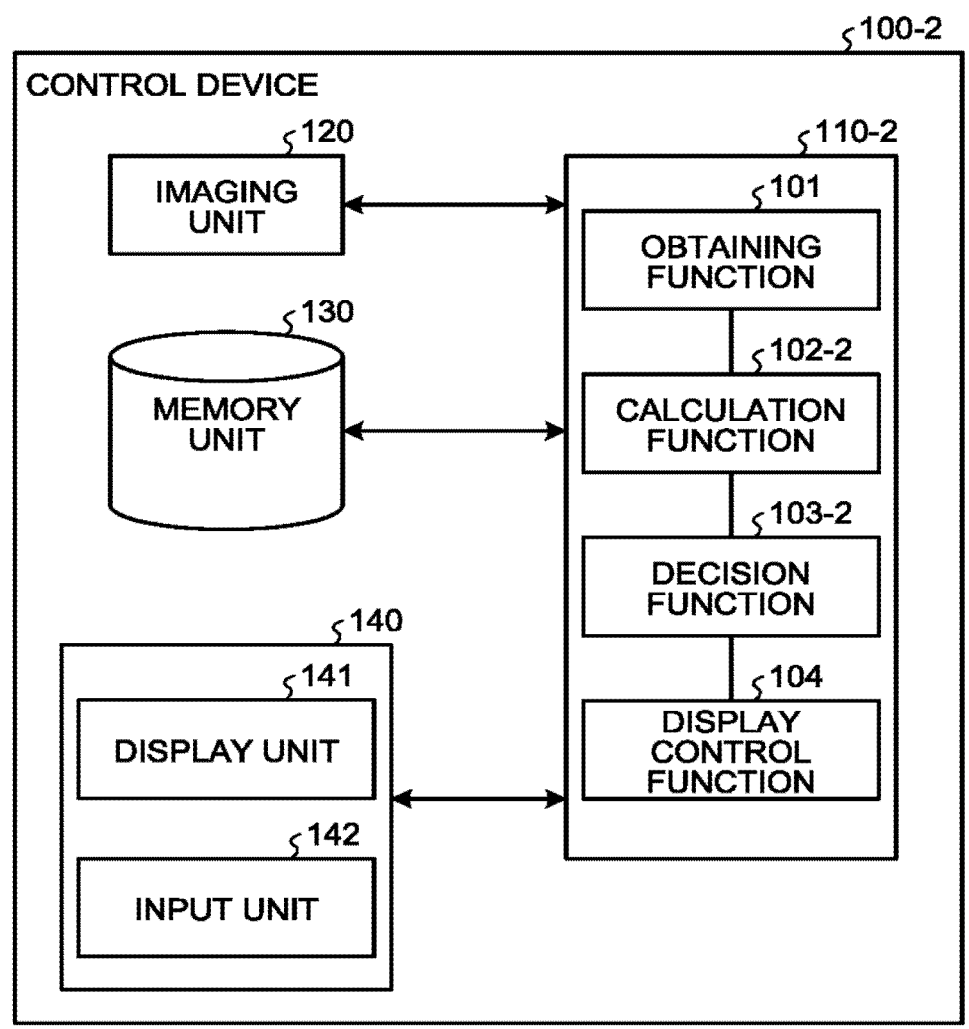
FIG. 6 is a block diagram of a control device according to a second embodiment.

FIG. 6 is a block diagram illustrating an exemplary configuration of a control device 100-2 according to the second embodiment. As illustrated in FIG. 6, the control device 100-2 includes a processor circuit 110-2, the imaging unit 120, the memory unit 130, and the UI unit 140.

In the second embodiment, a calculation function 102-2 and a decision function 103-2 of the processor circuit 110-2 are different than the corresponding functions in the first embodiment. The remaining configuration and the remaining functions are identical to FIG. 1 representing the block diagram of the control device 100 according to the first embodiment. Hence, the same reference numerals are used and the same explanation is not repeated.

The calculation function 102-2 detects the first target captured in an image, detects the second target representing some part of the first target, and calculates the likelihood indicating whether the second target is concealed. The following explanation is given for an example in which the upper body of a person is detected as the first target, and the face of that person is detected as the second target. However, the first target and the second target are not limited to this example. For example, a vehicle can be treated as the first target, and the corresponding license plate can be treated as the second target.

The calculation function 102-2 firstly detects the upper body of each person from an image, and calculates a likelihood $L1$ (a first likelihood or an upper body likelihood) indicating the probability of the target being the upper body. Regarding a person having the likelihood $L1$ higher than a threshold value (a third threshold value), the calculation function 102-2 detects the face from the image and calculates a likelihood $L2$ (a second likelihood or a face likelihood) indicating the probability of being the face.

The likelihood $L1$ of the upper body can be calculated, for example, using the profile of the head part or using the shape of the shoulders. For example, the calculation function 102-2 calculates the likelihood $L1$ to be high if the luminance value or the luminance gradient extracted from the image represents the profile of the head part or the shape of the shoulders. Herein, since the head part or the shape of the shoulders is not easily affected by an object for concealment that causes a change in the color or the texture of the face, the upper body likelihood becomes high even if the person is concealing the face. Since the likelihood $L2$ of the face is calculated using the color or the texture of the face, it is low for a person who is concealing the face.

The decision function 103-2 decides on the output method for outputting the target according to the likelihoods $L1$ and $L2$. As described above, the likelihood $L1$ of the upper body is not easily affected by the object for concealment used on the face. When the likelihood $L1$ is low, there is a possibility that a place at which the person is not present is being erroneously recognized. Hence, it is desirable that highlighting is avoided by thinning down the thickness of the lines and by increasing the degree of transparency.

On the other hand, when an object for concealment is used on the face, the likelihood $L2$ of the face becomes low. Hence, in the case in which the likelihood $L2$ is higher than a certain threshold value; lower the likelihood $L2$, desirably the more highlighted is the display of the face.

Thus, the decision function 103-2 decides on the output method in which, smaller the product of the reciprocal of the likelihood $L1$ with the likelihood $L2$, the more highlighted is the display. As a result, a person having a high likelihood $L1$ of the upper body and having a low likelihood $L2$ of the face can be displayed in a highlighted manner. The decision function 103-2 can decide on the output method in which, smaller the sum of the reciprocal of the likelihood $L1$ with the likelihood $L2$, the more highlighted is the display. In that case, a person having a high likelihood $L1$ of the upper body or having a low likelihood $L2$ of the face can be displayed in a highlighted manner.

Figure 7:
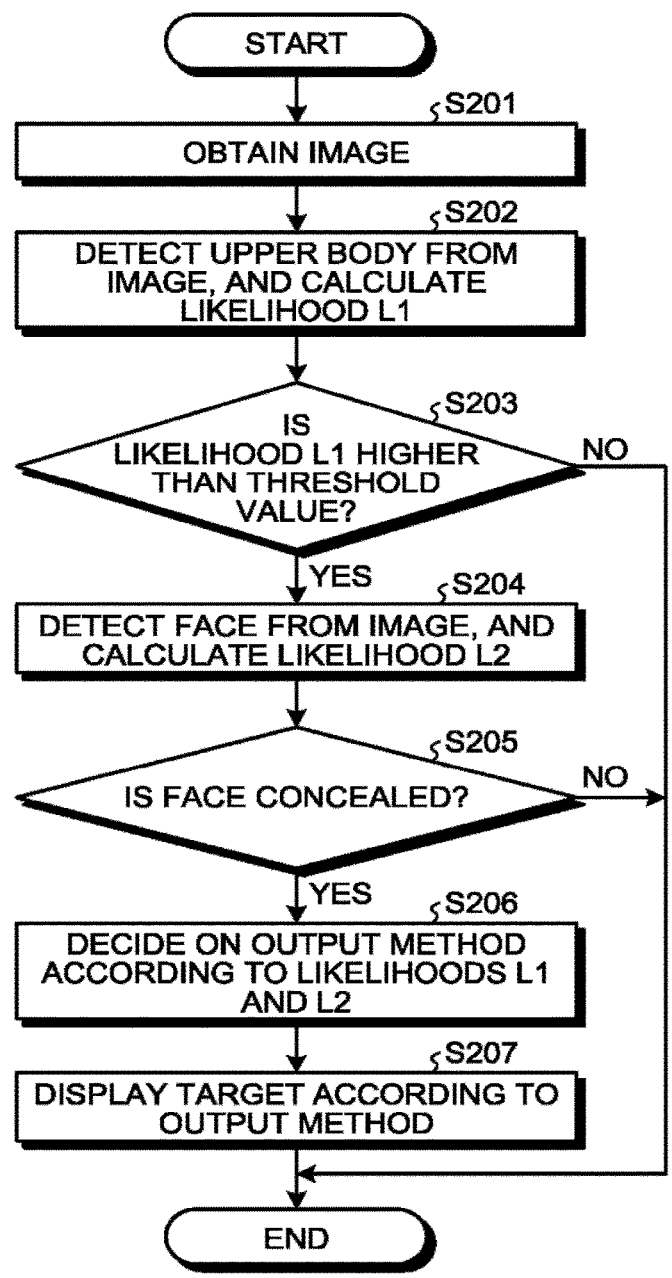
FIG. 7 is a flowchart for explaining an example of a display control operation according to the second embodiment.

Explained below with reference to FIG. 7 is a display control operation performed in the control device 100-2 that is configured in the abovementioned manner according to the second embodiment. FIG. 7 is a flowchart for explaining an example of the display control operation according to the second embodiment.

The obtaining function 101 obtains the target image for processing (Step S201). The calculation function 102-2 detects a first target (upper body) from the obtained image and calculates the likelihood $L1$ indicating the probability of being the first target (Step S202). The calculation function 102-2 determines whether or not the likelihood $L1$ is higher than a threshold value (Step S203).

When the likelihood $L1$ is not higher than the threshold value (No at Step S203), it marks the end of the operations. When the likelihood is higher than the threshold value (Yes at Step S203), the calculation function 102-2 detects the second target (the face) from such an area in the obtained image at which the likelihood $L1$ has become higher than the threshold value, and calculates the likelihood $L2$ indicating the probability of being the face (Step S204).

The decision function 103-2 determines whether or not the detected target is concealed (Step S205). For example, when the likelihood $L2$ is higher than the first threshold value but is lower than the second threshold value, the decision function 103-2 determines that the face is concealed.

If the face is not concealed (No at Step S205), the operations are ended without displaying the concerned face in a highlighted manner. However, if the target is concealed (Yes at Step S205), the decision function 103-2 decides on the output method according to the likelihoods $L1$ and $L2$ (Step S206). For example, the decision function 103-2 decides on the output method in which, smaller the product of the reciprocal of the likelihood $L1$ with the likelihood $L2$, the more highlighted is the display of the target.

The display control function 104 displays the target according to the decided output method (Step S207).

In this way, in the control device according to the second embodiment, the output method is controlled using a plurality of likelihoods (the upper body likelihood and the face likelihood). As a result, the concealed target can be displayed in a highlighted manner with a higher degree of accuracy.

Third Embodiment

In a control device according to a third embodiment, firstly, a first target (the entire body or the upper body of a person) captured in an image as well as the direction of movement of the first target is detected. Then, according to the direction of movement, it is decided whether or not detect the second target (the face) representing some part of the first target.

Figure 8:
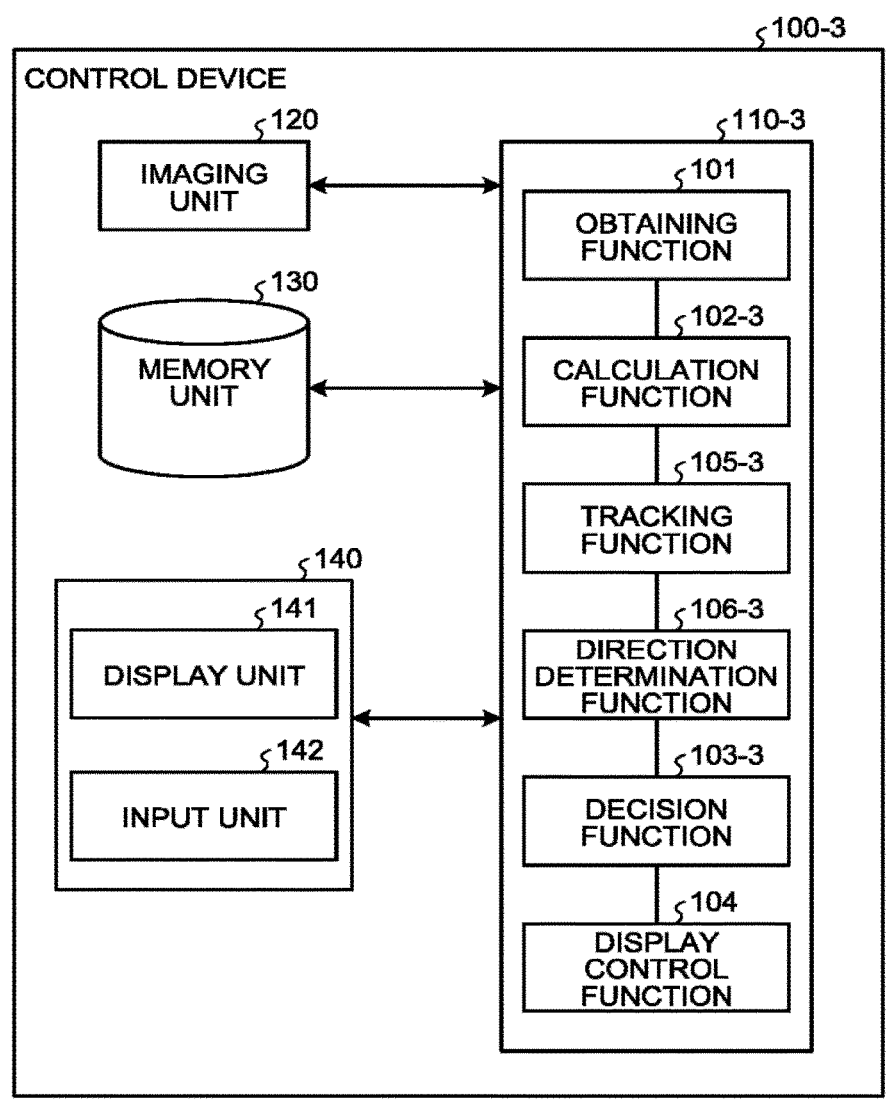
FIG. 8 is a block diagram of a control device according to a third embodiment.

FIG. 8 is a block diagram illustrating an exemplary configuration of a control device 100-3 according to the third embodiment. As illustrated in FIG. 8, the control device 100-3 includes a processor circuit 110-3, the imaging unit 120, the memory unit 130, and the UI unit 140.

In the third embodiment, a calculation function 102-3 and a decision function 103-3 of the processor circuit 110-3 are different than the corresponding functions in the second embodiment. Moreover, as compared to the second embodiment, the third embodiment differs in the way that the processor circuit 110-3 further includes a tracking function 105-3 and a direction determination function 106-3. The remaining configuration and the remaining functions are identical to FIG. 6 representing the block diagram of the control device 100-2 according to the second embodiment. Hence, the same reference numerals are used and the same explanation is not repeated.

The calculation function 102-3 detects the first target (for example, the upper body of a person) captured in an image, and calculates the likelihood indicating the probability of being the first target. Moreover, the calculation function 102-3 detects the second target (for example, the face of the person) representing some part of the first target, and calculates the likelihood indicating whether the second target is concealed. Herein, if the direction of movement determined by the direction determination function 106-3 (described later) represents a particular direction, then the calculation function 102-3 performs an operation to detect the second target.

Based on the target (for example, the upper body of the person) detected from a plurality of images (such as a moving image including a plurality of frames), the tracking function 105-3 tracks the person and generates information (a tracklet) of the person being tracked. For example, a tracklet includes information indicating the positions of the person. The tracklet can be stored in the memory unit 130, for example.

The direction determination function 106-3 refers to the tracklet, and determines the direction of movement of the first target. The direction determination function 106-3 is an example of a direction determining unit. For example, the direction determination function 106-3 refers to the tracklet and calculates the direction of walking (an example of the direction of movement) of the person, and determines whether the person is walking in the direction in which the face should be visible in the video (an example of the particular direction). If the person is walking in the direction in which the face should be visible, the calculation function 102-3 further performs the operations of detecting the face of that person and calculating the likelihood.

The method of determining the direction of movement is not limited to the method of implementing the target tracking technology using a moving image. That is, as long as the direction of movement of the target can be determined from images, any method can be implemented.

The decision function 103-3 decides on the output method for outputting the target according to the likelihoods L1 and L2. Herein, the decision function 103-3 can decide on the output method using a plurality of likelihoods calculated from a plurality of images (for example, a plurality of frames in which the face is detected). For example, the decision function 103-3 calculates the average of a plurality of likelihoods L1 and the average of a plurality of likelihoods L2 calculated from a plurality of images. Then, the decision function 103-3 decides on the output method for outputting the target according to the average values.

Figure 9:
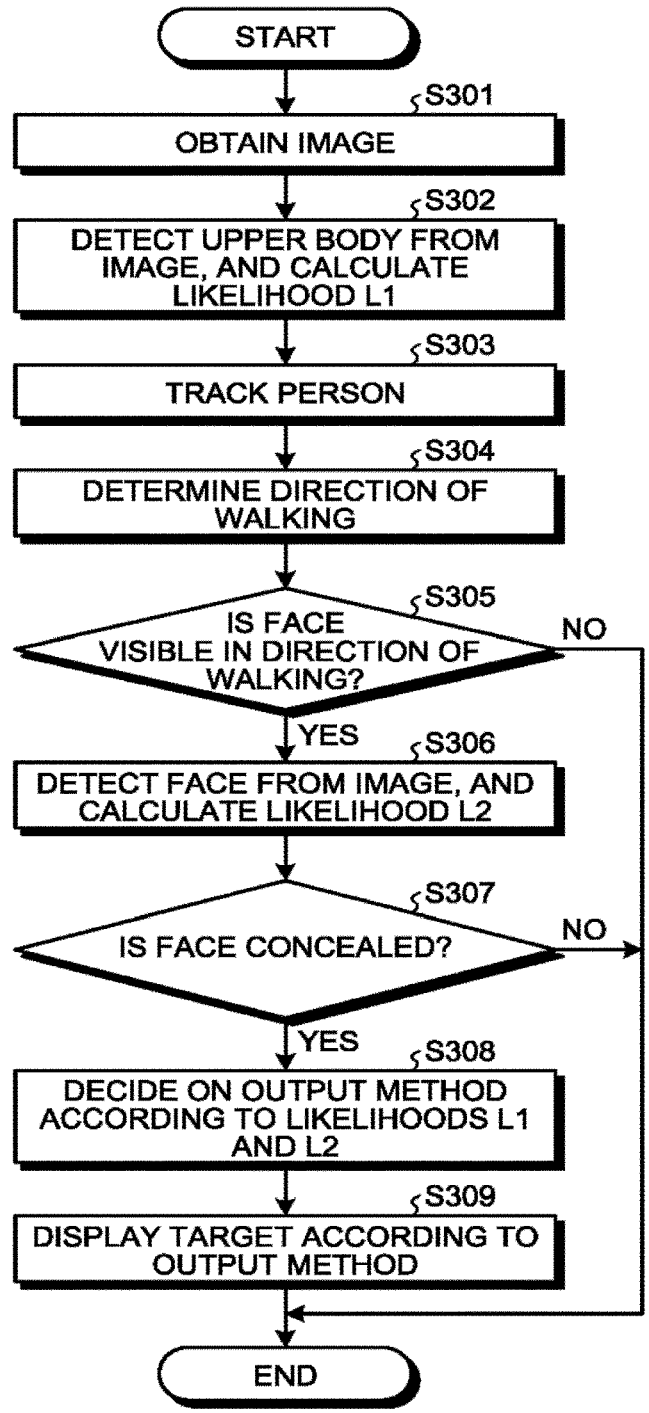
FIG. 9 is a flowchart for explaining an example of a display control operation according to the third embodiment.

Explained below with reference to FIG. 9 is a display control operation performed in the control device 100-3 that is configured in the abovementioned manner according to the third embodiment. FIG. 9 is a flowchart for explaining an example of the display control operation according to the third embodiment.

The operations performed at Steps S301 and S302 are identical to the operations performed at Steps S201 and S202 by the control device 100-2 according to the second embodiment. Hence, that explanation is not repeated.

The tracking function 105-3 tracks the person using the detection result and calculates a tracklet (Step S303). The direction determination function 106-3 refers to the tracklet and determines the direction of walking of the person (Step S304).

The calculation function 102-3 determines whether or not the direction of walking represents the particular direction (for example, the direction in which the face is visible to the imaging unit 120) (Step S305).

If the direction of walking does not represent the particular direction (No at Step S305), it marks the end of the operations. With that, it becomes possible to avoid a situation in which the face detection operation is performed even if the face is not visible.

When the direction of walking represents the particular direction (Yes at Step S305), the calculation function 102-3 detects the second target (the face) from such an area in the obtained image at which the likelihood L1 is higher than the threshold value, and calculates the likelihood L2 indicating the probability of being the face (Step S306).

The operations performed from Steps S307 to S309 are identical to the operations performed from Steps S205 to S207 performed by the control device 100-2 according to the second embodiment. Hence, that explanation is not repeated.

Figure 10:
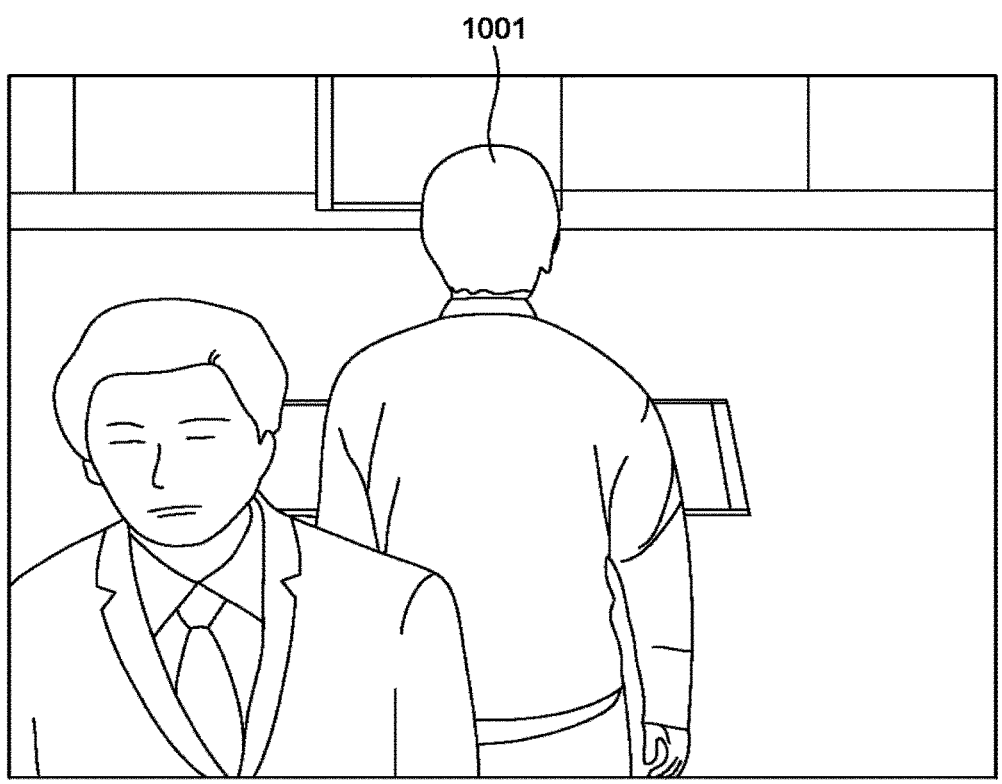
FIG. 10 is a diagram illustrating an example of a display screen according to the third embodiment.

Given below is the explanation of an example of the display screen according to the third embodiment. FIG. 10 is a diagram illustrating an example of the display screen according to the third embodiment. In FIG. 10, a person 1001 is walking in the direction in which the face is not visible to the imaging unit 120. Hence, it is determined that the direction of walking does not represent the particular direction (No at Step S305), and the person 1001 is not considered for highlighted display.

In this way, in the control device according to the third embodiment, for example, regarding a person who is walking in a direction in which the face is not visible (i.e., a person walking in the opposite direction to the light axis direction of the imaging unit 120), it becomes possible to not consider that person for highlighted display. That enables avoiding erroneous recognition, and only the persons concealing their faces can be displayed in a highlighted manner.

As described above, according to the first to third embodiments, a concealed target can be confirmed with more ease.

A computer program executed in the information processing device according to the first, second, and third embodiments is stored in advance in a read only memory (ROM).

Alternatively, the computer program executed in the control device according to the first to third embodiments can be recorded as an installable file or an executable file in a computer-readable recording medium such as a compact disk read only memory (CD-ROM), a flexible disk (FD), a compact disk recordable (CD-R), or a digital versatile disk (DVD); and can be provided as a computer program product.

Still alternatively, the computer program executed in the control device according to the first to third embodiments can be stored in a downloadable manner in a computer connected to a network such as the Internet. Still alternatively, the computer program executed in the control device according to the first to third embodiments can be distributed over a network such as the Internet.

The computer program executed in the control device according to the first to third embodiments can make a computer to function as the constituent elements described above. In that computer, a central processing unit (CPU) can read the computer program from a computer-readable memory medium into a main memory device, and execute the computer program.

The computer according to the embodiments executes the operations, which are explained in the embodiments, based on the computer program stored in a memory medium; and can be configured as a single device such as a personal computer or a microcomputer or can be configured as a system in which a plurality of devices is connected via a network. Moreover, the term "computer" according to the embodiments is an all-inclusive term not only limited to a personal computer but also applicable to a device that includes a processor and a microcomputer of an information processing device and that is capable of implementing the functions according to the embodiments using computer programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device comprising:
a memory; and
one or more processors configured to
  detect a target captured in an image;
  calculate likelihood, which when higher than a threshold value indicates that the target is concealed, a smaller likelihood value that is larger than the threshold value but smaller than another likelihood value that is also larger than the threshold value indicating that the target is more concealed than the other likelihood value;
decide on an output method for outputting the target in which, the smaller likelihood that is higher than the threshold value causes a more highlighted display of the target than the other likelihood value; and
generate a display image based on the image and the decided output method.

2. The control device according to claim 1, wherein the processors detect a first target captured in an image,
detect a second target representing some part of the first target, and
calculate likelihood indicating whether the second target is concealed.

3. The control device according to claim 2, wherein the processors
  calculate a first likelihood indicating probability of being the first target,
  when the first likelihood is higher than a threshold value, detect the second target,
  calculate a second likelihood indicating whether the second target is concealed, and
  generate a display image based on the image, the first likelihood and the second likelihood.

4. The control device according to claim 3, wherein the processors generate a display image based on the image and product of reciprocal of the first likelihood with the second likelihood.

5. The control device according to claim 2, wherein the processors further configured to determine direction of movement of the first target, and
  when the direction of movement represents a particular direction, detect the second target.

6. The control device according to claim 5, wherein the processors
  detect the first target and calculates the first likelihood from each of a plurality of images,
  when the direction of movement represents a particular direction, detect the second target,
  calculate a second likelihood indicating whether the second target is concealed, and
  generate a display image based on the image, average of a plurality of the first likelihood calculated from each of a plurality of images, and average of a plurality of the second likelihood calculated from each of a plurality of images.

7. A control method comprising:
detecting a target captured in an image;
calculating likelihood, which when higher than a threshold value indicates that the target is concealed, a smaller likelihood value that is larger than the threshold value but smaller than another likelihood value that is also larger than the threshold value indicating that the target is more concealed than the other likelihood value;
deciding on an output method for outputting the target in which, the smaller likelihood that is higher than the threshold value causes a more highlighted display of the target than the other likelihood value; and
generating a display image based on the image and the decided output method.

8. The control method according to claim 7, wherein the calculating of the likelihood includes
  detecting a first target captured in an image,
  detecting a second target representing some part of the first target, and
  calculating likelihood indicating whether the second target is concealed.

9. The control method according to claim 8, wherein the calculating of the likelihood includes
  calculating a first likelihood indicating probability of being the first target,
  when the first likelihood is higher than a threshold value, detect the second target,
  calculating a second likelihood indicating whether the second target is concealed, and
  the display image is generated based on the image, the first likelihood and the second likelihood.

10. A computer program product having a non-transitory computer readable medium including programmed instructions, wherein the instructions, when executed by one or more computers, cause the computers to perform a method comprising:
  detecting a target captured in an image;
  calculating likelihood, which when larger than a threshold value indicates that the target is concealed, a smaller likelihood value that is larger than the threshold value but smaller than another likelihood value that is also larger than the threshold value indicating that the target is more concealed than the other likelihood value;
  deciding on an output method for outputting the target in which, the smaller likelihood that is higher than the threshold value causes a more highlighted display of the target than the other likelihood value; and
  generating a display image based on the image and the decided output method.

* * * * *